Patented Nov. 6, 1934

1,979,421

UNITED STATES PATENT OFFICE 1,979,421

BIOLOGICAL PRODUCT AND PROCESS FOR PRODUCING THE SAME

Robert W. Terry, Columbus, Ohio

No Drawing. Application March 7, 1929,
Serial No. 345,231

6 Claims. (Cl. 167—78)

This invention relates to an improved biological product and process of producing the same and, in its more limited aspects, the invention has specific reference to a product known as "Pullorin" although it will be later understood that the invention has application to biological products of other kinds and purposes.

Pullorin is a scientific term which is applied to a biological product that is used as a diagnostic agent for the detection of infection with Salmonella pullora, the organisms causing the disease known as "bacillary white diarrhea".

This product is applied at the present time to adult fowls in essentially the following manner: A small quantity, usually about $\frac{1}{20}$ cubic centimeter is injected into the wattle of the fowl and after an interval of usually about 20 hours, if a swelling is present it is considered that the fowl is infected with Salmonella pullora, conversely, no swelling indicating freedom from the infection.

Bacillary white diarrhea is a disease perpetuated in flocks of fowls by hereditary transmission from infected hens to the chicks through infected eggs. In adult stock the disease is rarely of any significance. In most cases the organisms are localized and do not cause any particular disturbance to the hen except in the majority of cases egg production is lessened. A certain proportion of the eggs from the infected hens have the disease germs in them and when the chicks are hatched from these eggs they will be infected and spread the disease to the chicks that were not infected through hereditary channels. When those, that were infected with the disease, and yet survived, become adult hens, they will harbor Salmonella pullora and reinfect the next generation. It seems that the disease is ordinarily only fatal to chicks in the first days of life and after ten days to two weeks of age the chicks seem to develop sufficient resistance to the organisms that infection is not fatal, but medicinal treatment of the chick is of little value. The only practical control of the disease is the elimination of infected hens from the breeding flocks. This can be accomplished by the test, in the manner above noted, wherein Pullorin is injected into the bird and the reaction of the fowl to the test observed.

Pullorin is a product that has been made by several different procedures, which may be briefly described as follows: "A culture of several strains of B pullorum, (now known as Salmonella pullora) from widely separated sources is grown in bouillon at a temperature of 37.5° C. for a period of thirty days to three months."—"The product is then sterilized at a temperature of 60° C. for a period of one hour and carbolic acid is added in sufficient quantity to form a 0.5% solution for preserving purposes. In the earlier experiments of the authors the product was passed through a Berkefeld filter and concentrated to one-tenth of its original volume. Later it was found that the original sterilized product concentrated to one-fifth of its volume gave as satisfactory results." Diseases of Domesticated Birds, Ward & Gallagher, 1920, P. 79.

In another method of producing pullorin, "A culture is made from several strains of S. pullora from widely separated sources, grown in bouillon at a temperature of 37° C. for a period of from 30 days to two months. The product is then sterilized in a water bath at a temperature of 60° C. for sixty minutes. To this product there is added 0.5% carbolic acid as a preservative. This is then concentrated by evaporation to $\frac{1}{5}$ its original volume." Poultry Diseases, Kaupp, 1927, P. 203. The pullorins produced by the above two processes are of such a nature that $\frac{1}{5}$ cubic centimeter is recommended as the test dose, whereas the pullorin described herein produces satisfactory results when only $\frac{1}{20}$ cubic centimeter is used as a test dose.

It is also understood that this product has been produced in a powder form essentially as follows:

Broth cultures are allowed to incubate for periods ranging from one to three months or longer, concentrated by evaporation, and then the concentrated liquid poured into large quantities of some solvent causing precipitation of protein like materials such as methyl alcohol. The precipitate then is washed, dried and powdered.

These are, of course, the general procedures that have been used for the production of certain types of tuberculin and mallein. Pullorin has also been produced commercially in a form consisting simply of a suspension of salmonella pullora organisms in phenolized salt solution. This is prepared by growing the organism on agar, washing off as in the usual procedure and then marketing the material in this condition or centrifuging the bacterial suspension and resuspending the organisms in phenolized salt, or, the cultures may be grown in broth, the broth centrifuged and the organisms then suspended in phenolized salt.

The pullorin comprising the present invention is produced essentially in the following manner: The suspension of the salmonella pullora organisms, produced by any standard procedure either centrifuged and washed or not, is effected in distilled water. A salt-phenol solution could be used as a suspending material, but the process described herein actually produces the proper amount of salt (approximately 0.85% in the finished product) so that the organisms are preferably, but not necessarily, suspended in the distilled water for the purposes of this discovery.

At the present time, the production of the bacterial suspension is prepared by the standard procedures of growing the organisms on the surface of agar media in flasks and washing these growths off in distilled water, all of which being performed by the usual bacteriological technic under strict sterile manipulations and proper tests are made to insure the purity of the organisms being used as well as their identity.

After the suspension of organisms is standardized, at present, to approximately 25,000 million per cubic centimeter, the following procedure takes place. The object of this process is to render soluble as much of the material as possible from the bacterial cells and to retain in solution any soluble matter formed during the growth of the culture. The bacterial suspension is brought to a temperature of between 36 to 38° C. To each 100 cubic centimeters or grams of this standardized bacterial suspension is added with agitation and under sterile technic 6.58 cubic centimeters of 2.5 normal sodium hydroxide. After the addition of this alkali, the mixture is maintained at the above temperature with occasional agitation for a period varying from 20 minutes to one hour. Then there is slowly added with sterile technic 6.58 cubic centimeters of 2.5 normal hydrochloric acid for each 100 cubic centimeters or grams of the original bacterial suspension or in other words, the same amount of hydrochloric acid solution is added as of sodium hydroxide solution.

In practice, during the acidification of the mixture, it is felt desirable to avoid making the mixture at any time more acid than pH 7.0. This is accomplished by determining the reaction several times after 95 to 97% of the theoretical amount of acid solution has been added. In some cases it has been observed that in the suspension of the organisms, especially if the media upon which they were grown contained glycerin, a slight acidity is present. In this case it has been found in practice that about 2% less than the theoretical amount of acid solution will bring the mixture to the desired reaction.

The hydrogen-ion concentration of the material is then again determined by colorimetric procedure and if it is not between pH 7.3 to 7.4 proper adjustment is made by either small quantities of hydrochloric acid or the sodium hydroxide solution to bring it to this reaction. Then for each 90 cubic centimeters of this mixture there is added 10 cubic centimeters of a 5% solution of phenol in 0.85% salt.

This material may then be filtered at once or it may be set aside for a period of from one to seven days during which time flocculation of certain insoluble material takes place which renders filtration of the product easier. The product is then filtered through bacteria retaining filters such as Berkefeld, Mandler or Seitz filters to render the product clear. A satisfactory procedure has been to give a preliminary filtration through a coarse grained Berkefeld filter and a final filtration through a Mandler filter of medium porosity. After taking the proper sterility tests, the product is then bottled in the usual manner and is ready for transportation and use.

The method has the advantage of permitting of rapid production of the pullorin and reduces the time of its production from weeks or months to a period of hours. The pullorin produced by the present invention is characterized by its non-cellular nature and in this respect particularly, a new product is produced in commercial quantities. It is generally understood that only a small portion of the bacterial cell is the substance or substances which produces reactions of this type. Therefore, the present invention provides for the rendering soluble of the materials and the separation of them from the insoluble materials, producing a product giving more specific reactions than the cellular pullorins because of the removal of interfering or inert substances.

What is claimed is:

1. The process of making the diagnostic biological product pullorin, which consists in producing a bacterial emulsion containing Salmonella pullora organisms by removing such organisms from the surface of agar media with the use of distilled water, in rendering soluble as much of the material as possible from the bacterial cells of said organisms by adding to said emulsion a regulated quantity of sodium hydroxide, neutralizing the emulsion by treatment with hydrochloric acid and then filtering to obtain a substantially clear product.

2. The process of treating Salmonella pullora organisms, which consists in producing a bacterial emulsion by removing a culture of such organisms from the surface of a culture media with distilled water, in rendering soluble as much of the material as possible from the cells of said organisms by adding to said emulsion when the latter is maintained at a temperature between 36 and 38° C. a regulated quantity of sodium hydroxide, neutralizing the emulsion by addition thereto of a substantially equal quantity of hydrochloric acid, and then filtering to obtain a clear product.

3. The process of making the diagnostic biological product pullorin which consists in producing a suspension of Salmonella pullora organisms to constitute a bacterial emulsion, treating said emulsion with a measured quantity of an alkali, of such strength as to render soluble the material comprising the bacterial cells then neutralizing by the addition of a substantially equal quantity of an acid, and then filtering to obtain a desired product.

4. The process of making the diagnostic biological product pullorin which consists in effecting a suspension of Salmonella pullora organisms in distilled water, standardizing the suspension of organisms to approximately 25,000 million per cubic centimeter, in rendering soluble as much of the material as possible from the bacterial cells of said organisms by first bringing the emulsion to a temperature of between 36 to 38° C., in adding to each 100 cubic centimeters of this standardized bacterial suspension under conditions of rapid agitation 6.58 cubic centimeters of 2.5 normal sodium hydroxide, maintaining the mixture at said last named temperature with intermittent agitation for a period of time varying between substantially twenty minutes to one hour, then slowly adding to the mixture 6.58 cubic centimeters of 2.5 normal hydrochloric acid for each 100 cubic centimeters of the original bacterial suspension and clarifying the mixture by suitably removing therefrom the liberated cellular debris.

5. The process of making the diagnostic biological product pullorin which consists in effecting a suspension of Salmonella pullora organisms in distilled water, standardizing the suspension of organisms to approximately 25,000 million per cubic centimeter, in rendering soluble as much of the material as possible from the bacterial cells of said organisms by first bringing the emulsion to a temperature of between 36 to 38° C., in adding to each 100 cubic centimeters of this standardized bacterial suspension under conditions of rapid agitation 6.58 cubic centimeters of 2.5 normal sodium hydroxide, maintaining the mixture at said last named temperature with intermittent agitation for a period of time varying between substantially twenty minutes to one hour, then slowly adding to the mixture 6.58 cubic centimeters of 2.5 normal hydrochloric acid for each 100 cubic centimeters of the original bacterial suspension, then adding to each 90 cubic centimeters of this finished mixture 10 cubic centimeters of a 5% solution of phenol in .85% salt, and then passing the product through bacteria retaining filters to secure a final product of desired clearness.

6. The process of producing the diagnostic biological agent pullorin which consists of treating a suspension of Salmonella pullora with a regulated quantity of sodium hydroxide, maintaining the mixture at a temperature of substantially 37° C. for a period in excess of twenty minutes, neutralizing the mixture by the addition of regulated quantities of hydrochloric acid and then removing the insoluble matter present in the mixture.

ROBERT W. TERRY.